US010546137B2

United States Patent
Hu et al.

(10) Patent No.: US 10,546,137 B2
(45) Date of Patent: Jan. 28, 2020

(54) METHOD AND APPARATUS FOR PROTECTING APPLICATION PROGRAM PASSWORD OF MOBILE TERMINAL

(71) Applicant: TENCENT TECHNOLOGY (SHENZHEN) COMPANY LIMITED, Shenzhen, Guangdong (CN)

(72) Inventors: Zhao Hu, Shenzhen (CN); Xin Jiang, Shenzhen (CN); Hao Wu, Shenzhen (CN); Siwei Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 241 days.

(21) Appl. No.: 15/352,021

(22) Filed: Nov. 15, 2016

(65) Prior Publication Data

US 2017/0061139 A1 Mar. 2, 2017

Related U.S. Application Data

(63) Continuation of application No. PCT/CN2015/082084, filed on Jun. 23, 2015.

(30) Foreign Application Priority Data

Jun. 25, 2014 (CN) .......................... 2014 1 0294478

(51) Int. Cl.
*G06F 21/60* (2013.01)
*G06F 21/31* (2013.01)
(Continued)

(52) U.S. Cl.
CPC ............ *G06F 21/60* (2013.01); *G06F 3/0233* (2013.01); *G06F 3/0238* (2013.01);
(Continued)

(58) Field of Classification Search
CPC .......... G06F 21/60; G06F 21/31; G06F 21/33; G06F 21/83; G06F 21/84; G06F 3/0238; G06F 3/0488
See application file for complete search history.

(56) References Cited

U.S. PATENT DOCUMENTS 4,829,576 A * 5/1989 Porter ..................... G10L 15/00
704/235
5,537,544 A * 7/1996 Morisawa ............... G06F 21/31
713/183
(Continued)

FOREIGN PATENT DOCUMENTS

| CN | 101493750 A | 7/2009 |
| CN | 102197350 A | 9/2011 |

(Continued)

OTHER PUBLICATIONS

Notification of the First Office Action of Japanese application No. 2016-543120, dated Sep. 5, 2017 (and English translation).
(Continued)

*Primary Examiner* — Sher A Khan
(74) *Attorney, Agent, or Firm* — Brinks Gilson & Lione (57) ABSTRACT

A method and an apparatus for protecting an application program password of a mobile terminal are described. The method includes: positioning an application interface view in an application program of a mobile terminal, so as to obtain a currently activated application interface view; determining whether the currently activated application interface view is an input box; and if yes, acquiring a key input event triggered in the input box and obtaining an input character by using the key input event; and replacing the character with a fake password character. A related apparatus is also described.

9 Claims, 4 Drawing Sheets

(51) Int. Cl.
*G06F 3/023* (2006.01)
*G06F 3/0488* (2013.01)

(52) U.S. Cl.
CPC ............ *G06F 3/0488* (2013.01); *G06F 21/31* (2013.01); *G06F 2221/031* (2013.01)

(56) References Cited

U.S. PATENT DOCUMENTS

| | | | |
|---|---|---|---|
| 8,547,348 B2 | 10/2013 | Jonsdottir | |
| 8,640,252 B2* | 1/2014 | Cragun | G06F 21/36 726/26 |
| 2002/0152070 A1* | 10/2002 | Oda | G07O 9/00158 704/246 |
| 2003/0093381 A1* | 5/2003 | Hohl | G06F 21/83 705/50 |
| 2005/0144484 A1* | 6/2005 | Wakayama | G06F 21/31 726/19 |
| 2006/0101128 A1 | 5/2006 | Waterson | |
| 2006/0197685 A1* | 9/2006 | Wormald | G06F 3/0233 341/22 |
| 2006/0212679 A1* | 9/2006 | Alfano | G06F 1/08 712/38 |
| 2007/0113206 A1* | 5/2007 | Suzuki | B41J 3/4075 715/858 |
| 2008/0077974 A1* | 3/2008 | Ogawara | G06F 21/36 726/4 |
| 2008/0289035 A1* | 11/2008 | Delia | G06F 21/31 726/20 |
| 2009/0157948 A1* | 6/2009 | Trichina | G06F 12/0246 711/103 |
| 2009/0254994 A1 | 10/2009 | Waterson | |
| 2010/0066694 A1 | 3/2010 | Jonsdottir | |
| 2010/0174421 A1* | 7/2010 | Tsai | G06F 1/1616 700/302 |
| 2010/0289746 A1* | 11/2010 | Tojima | G06F 3/0233 345/168 |
| 2012/0054435 A1* | 3/2012 | Arnold | G06F 9/30018 711/118 |
| 2012/0174233 A1 | 7/2012 | Waterson | |
| 2012/0246555 A1* | 9/2012 | Masten | G06F 21/31 715/234 |
| 2013/0067373 A1* | 3/2013 | Weir | G06F 3/033 715/769 |
| 2013/0080979 A1* | 3/2013 | Weir | G06F 3/033 715/856 |
| 2014/0101772 A1* | 4/2014 | Anzai | G06F 21/83 726/26 |
| 2014/0259130 A1* | 9/2014 | Li | G06F 21/31 726/6 |
| 2014/0359528 A1* | 12/2014 | Murata | G06F 3/04847 715/833 |
| 2015/0020018 A1* | 1/2015 | Wang | G06F 21/83 715/773 |
| 2015/0106923 A1 | 4/2015 | Waterson | |
| 2015/0135291 A1* | 5/2015 | Yang | G06F 21/31 726/6 |
| 2016/0098232 A1* | 4/2016 | Sato | G06F 3/1222 358/1.14 |
| 2016/0248764 A1* | 8/2016 | Morikuni | H04L 63/08 |
| 2018/0241747 A1* | 8/2018 | Tanaka | H04L 9/085 |

FOREIGN PATENT DOCUMENTS

| | | |
|---|---|---|
| CN | 102750005 A | 10/2012 |
| CN | 103366137 A | 10/2013 |
| CN | 103414727 A | 11/2013 |
| CN | 103617382 A | 3/2014 |
| CN | 103714301 A | 4/2014 |
| CN | 103824033 A | 5/2014 |
| JP | 2002312318 A | 10/2002 |
| JP | 2002342288 A | 11/2002 |
| JP | 2005044054 A | 2/2005 |
| JP | 2006011940 A | 1/2006 |
| JP | 2007058807 A | 3/2007 |
| JP | 2008059173 A | 3/2008 |
| JP | 200915501 A | 1/2009 |
| JP | 2009199581 A | 9/2009 |
| JP | 2010277496 A | 12/2010 |
| JP | 2011114698 A | 6/2011 |
| JP | 2014075033 A | 4/2014 |
| JP | 2014075096 A | 4/2014 |

OTHER PUBLICATIONS

International Search Report in international application No. PCT/CN2015/082084, dated Sep. 30, 2015.
Written Opinion of the International Search Authority in international application No. PCT/CN2015/082084, dated Sep. 30, 2015.
Supplementary European Search Report in European application No. 15811280.5, dated Mar. 7, 2017.
Notification of the First Office Action of Chinese application No. 201410294478.X , dated Apr. 28, 2018.
Notice of Allowance of Japanese application No. 2016543120, dated Apr. 10, 2018.
Office Action issued in Chinese Application No. 201410294478.X, dated Oct. 31, 2018.
Office Action dated Feb. 25, 2019 for Chinese Application No. 201410294478.X, 7 pages.
Examination Report dated Mar. 4, 2019 for European Application No. 15 811 280.5, 6 pages.

* cited by examiner

METHOD AND APPARATUS FOR PROTECTING APPLICATION PROGRAM PASSWORD OF MOBILE TERMINAL

CROSS-REFERENCE TO RELATED APPLICATIONS

This is a continuation application of International Patent Application No. PCT/CN2015/082084, filed on Jun. 23, 2015, which claims the priority benefit of Chinese Patent Application No. 201410294478.X, filed on Jun. 25, 2014, the content of which are incorporated by reference herein in their entirety for all purposes.

FIELD OF THE TECHNOLOGY

The present disclosure relates to Internet application technologies, and in particular, to a method and an apparatus for protecting an application program password of a mobile terminal.

BACKGROUND OF THE DISCLOSURE

With the development of the Internet, a user can perform various input by using various mobile devices at any time and any place, for example, input a password for logging in to an instant messaging tool, and the user completes an operation of inputting the password by using a password input box of the instant messaging tool, so as to trigger a key input event in the password input box.

However, security problems related to various characters input by a user emerge one after another, and a manner of stealing a character obtained from the key input event in a system develops from manners such as a simple fake box manner to a stealing manner of memory interception and capturing that is highly technical.

To prevent an input character from being stolen, an application can load a customized keyboard when a user triggers an input operation, and take over a procedure of processing the key input event in a system. However, the customized keyboard has a compatibility problem, and the customized keyboard is no longer functional after malicious code is injected into the application.

In addition, the system may also intercept an input character by using a key input event callback function, so as to perform various encryption processing on the input character; however, because an intercepting point is a public interface of the system, and is at the end of a procedure of processing a key event by the system, the intercepting point is easily used by a destructor.

Therefore, processing on various key input events in an application has a security limitation, so that password security of an application program of a mobile terminal is not high.

SUMMARY

In view of the above, it is necessary to provide a method for protecting an application program password of a mobile terminal that can improve password security.

In addition, it is further necessary to provide a system for protecting an application program password of a mobile terminal that can improve password security.

A method for protecting an application program password of a mobile terminal, including the following steps:

positioning an application interface view in an application program of a mobile terminal, so as to obtain a currently activated application interface view;

determining whether the currently activated application interface view is an input box; and if yes, acquiring a key input event triggered in the input box and obtaining an input character by using the key input event; and replacing the character with a fake password character.

An apparatus for protecting an application program password of a mobile terminal, including:

a positioning module, configured to position an application interface view in an application program of a mobile terminal, so as to obtain a currently activated application interface view;

a determining module, configured to determine whether the currently activated application interface view is an input box, and if yes, notify an event acquiring module;

the event acquiring module, configured to acquire a key input event triggered in the input box and obtain an input character by using the key input event; and a replacing module, configured to replace the character with a fake password character.

According to the foregoing method and apparatus for protecting an application program password of a mobile terminal, an application interface view opened by an application program of a mobile terminal is positioned, so as to obtain a currently activated application interface view, and it is determined whether the currently activated application interface view is an input box; if yes, it indicates that a key input event in the input box is about to be triggered; in this case, the key input event triggered in the input box by a user is acquired, and an input character is obtained by using the key input event; the character is replaced to obtain a fake password character; and the obtained fake password character is delivered to a procedure of processing a key event by a system; and even if the fake password character is stolen, an actual character input in the input box cannot be known, which improves password security effectively.

DESCRIPTION OF EMBODIMENTS

To make objectives, technical solutions and advantages of the present disclosure clearer, the following further describes the present disclosure in detail with reference to the accompanying drawings and embodiments. It should be understood that, the specific embodiments described herein are merely intended to explain the present disclosure, but are not intended to limit the present disclosure.

Figure 1:
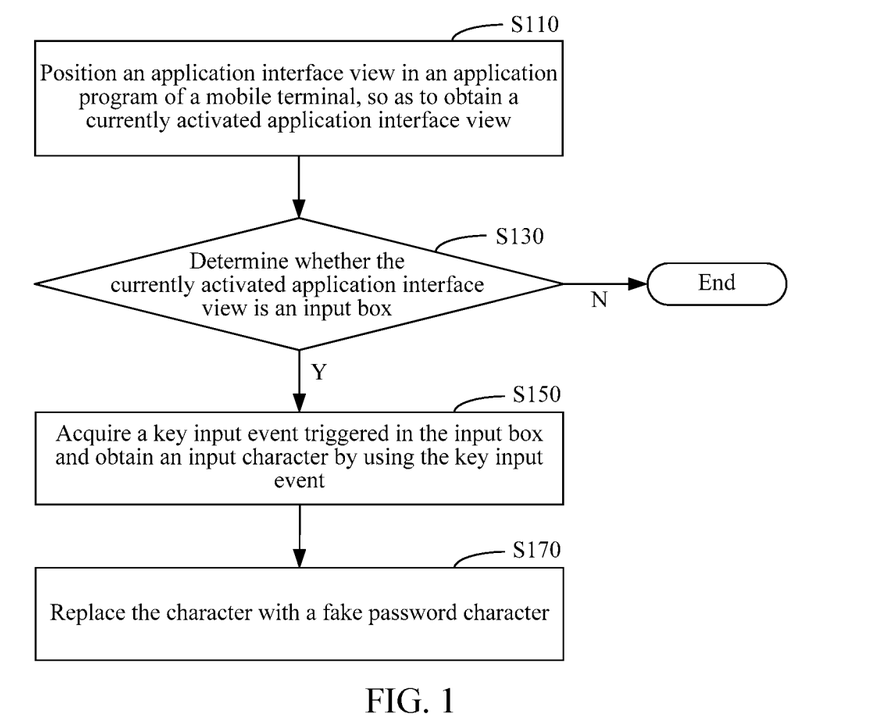
FIG. 1 is a flowchart of a method for protecting an application program password of a mobile terminal in an embodiment.

In an embodiment, as shown in FIG. 1, a method for protecting an application program password of a mobile terminal includes the following steps:

Step 110: Position an application interface view in an application program of a mobile terminal, so as to obtain a currently activated application interface view.

In this embodiment, the application interface view is a view displayed on a screen by the currently running application program of the mobile terminal, which provides a user with a corresponding operation interface, where a quantity of application interface views displayed on the screen is one or more, for example, the application interface view may be a button, an input box, and the like that can be provided for the user to trigger an operation.

The application interface view currently displayed on the screen is positioned, and an application interface view currently activated by the user is obtained along with an operation of the user.

In an embodiment, the foregoing step 110 includes: positioning, for the application program of the mobile terminal, an application interface view at which a touch point on a touch screen is located, where the application interface view at which the touch point is located is the currently activated application interface view.

In this embodiment, a screen for displaying an application interface view is a touch screen. With movement of a finger of the user on the touch screen, movement of a corresponding touch point is sensed; when the touch point moves to any application interface view, the application interface view is activated; and the application interface view at which the touch point is located is the currently activated application interface view.

Step 130: Determine whether the currently activated application interface view is an input box; and if yes, perform step 150; or if not, end the procedure.

In this embodiment, the currently activated application interface view is determined; if it is determined that the currently activated application interface view is the input box, it indicates that the user is about to trigger a key input event, and a character is input in the input box; and if it is determined that the currently activated application interface view is not the input box, it indicates that the user is about to trigger some other operations, which are not related to the key input event, and therefore, a procedure of processing the key input event is ended.

Specifically, it is determined, by using a touch event (TouchEvent event) callback function, whether the currently activated application interface view is the input box, so as to sense interaction between the user and the application accurately.

Step 150: Acquire a key input event triggered in the input box and obtain an input character by using the key input event.

In this embodiment, a character is input in the input box by using the key input event triggered in the input box; in this case, the input character generated by the key input event is directly acquired.

Step 170: Replace the character with a fake password character.

In this embodiment, every input character is replaced with a corresponding fake password character, so as to achieve an objective of disguise and interference, and to disturb a behavior of malicious stealing.

Through the foregoing processing on the key input event, a key input event triggered in an android platform is safer, and convenience is not provided for a malicious stealer because of a special open source feature thereof, which greatly reduces a risk that the input character is stolen, so that an application that has a payment function and runs in the android platform is safer in both login and payment stages.

Figure 2:
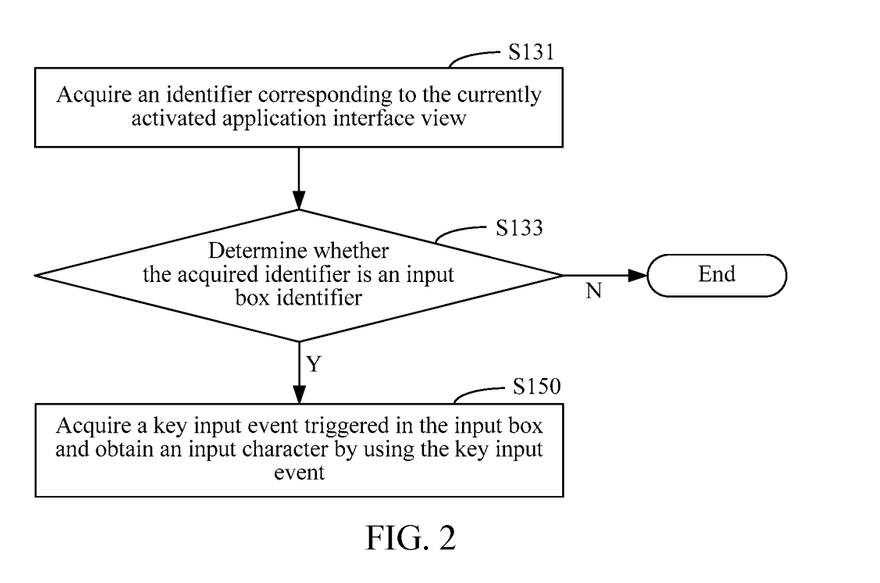
FIG. 2 is a flowchart of a method for determining whether a currently activated application interface view is an input box in FIG. 1.

In an embodiment, as shown in FIG. 2, the foregoing step 130 includes:

Step 131: Acquire an identifier corresponding to the currently activated application interface view.

In this embodiment, every application interface view has a unique corresponding identifier, and therefore, if the currently activated application interface view is positioned, the identifier corresponding to the currently activated application interface view is acquired.

With contact between the user and the screen, a system senses a captured touch event, and processes the touch event by using a specific interface function. Specifically, using an instant messaging tool as an example, when the user touches, on a start interface of the instant messaging tool, an area in which a password input box is located, an identifier corresponding to this area is acquired.

Step 133: Determine whether the acquired identifier is an input box identifier; and if yes, perform step 150; or if not, end the procedure.

In this embodiment, the acquired identifier indicates whether the currently activated application interface view is the password input box, that is, a password box control view; specifically, the acquired identifier is determined by calling a touch event callback function, so as to perform a subsequent processing process according to a determining result.

Figure 3:
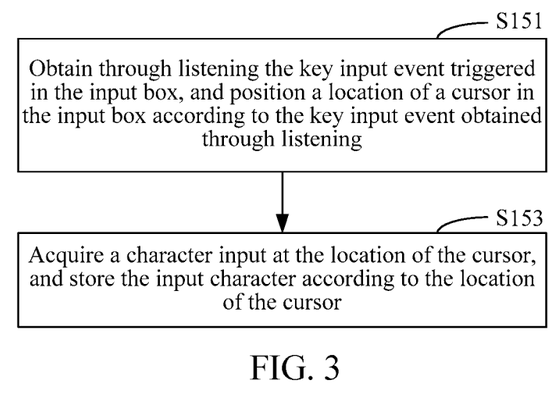
FIG. 3 is a flowchart of a method for acquiring a key input event triggered in the input box and obtaining an input character by using the key input event in FIG. 1.

In an embodiment, as shown in FIG. 3, the foregoing step 150 includes:

Step 151: Obtain through listening the key input event triggered in the input box, and position a location of a cursor in the input box according to the key input event obtained through listening.

In this embodiment, with a character is input in the input box, the location of the cursor also changes constantly. After the key input event triggered in the input box is obtained through listening, an onSelectionChanged function is reloaded to acquire the location of the cursor in the input box, so as to implement location tracking of the cursor in real time.

Step 153: Acquire a character input at the location of the cursor, and store the input character according to the location of the cursor.

In this embodiment, the location of the cursor is used as a subscript of character string array memory, and the input character is stored in the character string array memory, so as to implement accurate acquisition and storage of the character.

Specifically, for character input performed in the input box, a used input manner includes hard keyboard input and soft keyboard input, and therefore, the character is acquired according to an input manner.

In the hard keyboard input manner, the location of the cursor is acquired by reloading a dispatchKeyEvent function to acquire a currently input character, which is stored in a new character string array memory.

In the soft keyboard input manner, an InputConnection input channel is newly established; the newly established InputConnection input channel and a currently triggered key input event are bound; and the currently triggered key input event is processed by using the newly established Input-Connection input channel; in this case, system functions such as commintText, sendKeyEvent, setComposingText and finishComposingText are reloaded to intercept the currently input character, and the currently input character is copied into the new character string array memory.

The character string array memory stores the input character by using the location of the cursor as the subscript.

Figure 4:
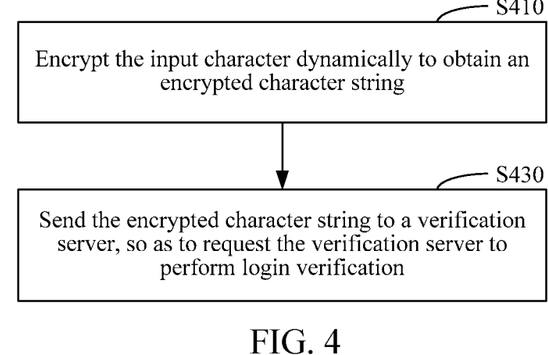
FIG. 4 is a flowchart of a method for protecting an application program password of a mobile terminal in another embodiment.

In an embodiment, as shown in FIG. 4, the foregoing input box is a password input box, and after the foregoing step 150, the foregoing method further includes the following steps:

Step 410: Encrypt the input character dynamically to obtain an encrypted character string.

In this embodiment, the acquired input character is a corresponding password when the user logs in to the application; therefore, to further ensure login security, the input character is dynamically encrypted, so that the password used to perform login verification is not transferred in a plaintext form.

Step 430: Send the encrypted character string to a verification server, so as to request the verification server to perform login verification.

In this embodiment, the application interacts with the verification server, so as to complete, by using the verification server, the login verification initiated by the application.

Specifically, the application sends the encrypted character string to the verification server, and after receiving the encrypted character string sent by the application, the verification server decrypts the encrypted character string to complete the login verification for the application, so as to ensure security of the login password.

By using the foregoing manner, the password is effectively prevented from being monitored and stolen by a malicious program, which ensures password security of the user, and improves security of the application.

In an embodiment, in a scenario in which the input box is the password input box, after the foregoing step 150, a step of detecting validity of the input character is further included.

In this embodiment, whether the input character satisfies a character form requirement specified by the application itself is detected, for example, an instant messaging tool only accepts a character string formed by characters within a specified range, and for other characters or special characters that are not within the specified range, the instant messaging tool cannot be logged in to normally; therefore, the validity of the input character needs to be detected to determine whether the input character is valid, and character replacement and dynamic encryption can be performed under the precondition that a determining result is yes, so as to ensure that the application runs normally.

Figure 5:
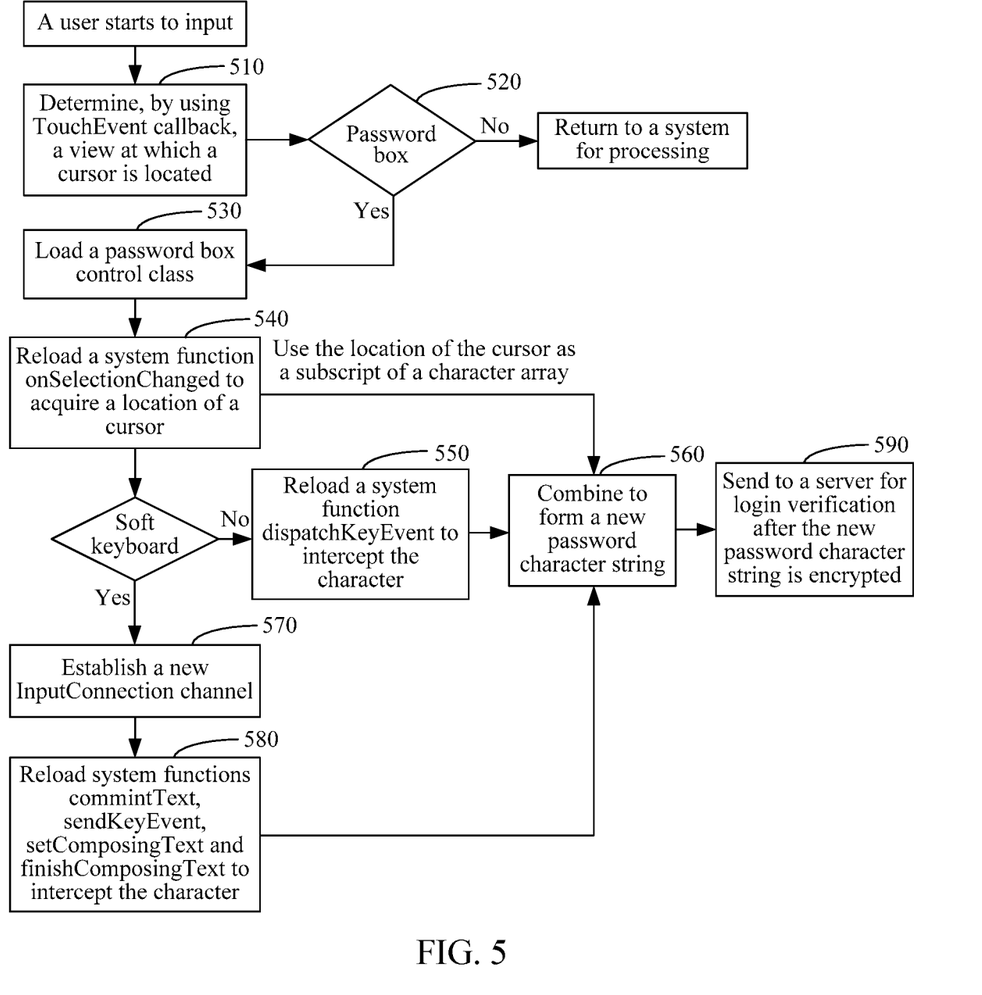
FIG. 5 is a schematic diagram of applying of protection on an application program password of a mobile terminal in an embodiment.

The following describes in detail the foregoing method for protecting an application program password of a mobile terminal with reference to a specific embodiment. In this embodiment, as shown in FIG. 5, in an application program run by a mobile terminal, an entire password protection procedure of the application program of the mobile terminal is triggered to start when a user starts to input.

Step 510 is first performed, where a view at which a cursor is located is determined by using TouchEvent callback and step 520 is performed to determine whether a view at which a current cursor is located is a password box, so as to sense interaction between the user and the application program of the mobile terminal accurately by using step 510 and step 520.

If it is determined, in step 520, that the view at which the current cursor is located is not the password box, it indicates that the currently performed interaction is not related to the password protection of the application program involved in the present disclosure; and therefore, a system performs processing.

If it is determined, in step 520, that the view at which the current cursor is located is the password box, a password box control class, that is, a password control view is loaded in step 530, and step 540 is performed with character input in the password box, which is reloading a system function onSelectionChanged to acquire a location of the cursor in the password box, so as to track movement of the cursor in the password box in real time.

Because a used input manner includes soft keyboard input and hard keyboard input, a character needs to be acquired according to an input manner.

That is, in a hard keyboard input scenario, step 550 is performed to reload a system function dispatchKeyEvent to intercept the character in the password box, and the location of the cursor obtained in step 540 is used as a subscript to form a new password character string, so as to be stored conveniently in a character string array memory.

In a soft keyboard input scenario, in step 570 and 580, a new InputConnection input channel is established, and system functions commintText, sendKeyEvent, setComposingText and finishComposingText are reloaded to intercept the character, so as to obtain a current input character in the password box; and the location of the cursor obtained in step 540 is used as the subscript to form the new password character string, so as to be stored conveniently in the character string array memory.

The new password character string obtained through combining is encrypted and then sent to a server for login verification, that is, login verification for the application program of the mobile terminal is completed by performing step 590, so that the password is not transferred in a plaintext form, which further ensures login security.

Figure 6:
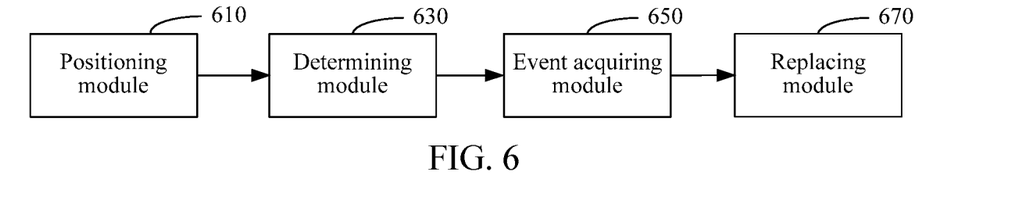
FIG. 6 is a schematic structural diagram of an apparatus for protecting an application program password of a mobile terminal in an embodiment.

As shown in FIG. 6, in an embodiment, an apparatus for protecting an application program password of a mobile terminal includes a positioning module 610, a determining module 630, an event acquiring module 650 and a replacing module 670.

The positioning module 610 is configured to position an application interface view, so as to obtain a currently activated application interface view.

In this embodiment, the application interface view is a view displayed on a screen by the currently running application, which provides a user with a corresponding operation interface, where a quantity of application interface views displayed on the screen is one or more, for example, the application interface view may be a button, an input box, and the like that can be provided for the user to trigger an operation.

The positioning module 610 positions the application interface view displayed on the screen, and an application interface view currently activated by the user is obtained along with an operation of the user.

In an embodiment, the positioning module 610 is further configured to position an application interface view at which a touch point on a touch screen is located, where the application interface view at which the touch point is located is the currently activated application interface view.

In this embodiment, a screen for displaying an application interface view is a touch screen. With movement of a finger of the user on the touch screen, the positioning module 610 senses movement of a corresponding touch point; when the touch point moves to any application interface view, the application interface view is activated; and the application interface view at which the touch point is located is the currently activated application interface view.

The determining module 630 is configured to determine whether the currently activated application interface view is an input box; and if yes, notify the event acquiring module 650; or if not, stop performing the procedure.

In this embodiment, the determining module 630 determines the currently activated application interface view; if the determining module 630 determines that the currently activated application interface view is the input box, it indicates that the user is about to trigger a key input event, and character input is performed in the input box; and if the determining module 630 determines that the currently activated application interface view is not the input box, it indicates that the user is about to trigger some other operations, which are not related to the key input event, and therefore, a procedure of processing the key input event is ended.

Specifically, the determining module 630 determines by using a touch event callback function, whether the currently activated application interface view is the input box, so as to sense interaction between the user and the application accurately.

The event acquiring module 650 is configured to acquire a key input event triggered in the input box and obtain an input character by using the key input event.

In this embodiment, a character is input in the input box by using the key input event triggered in the input box; in this case, the event acquiring module 650 directly acquires the input character generated by the key input event.

The replacing module 670 is configured to replace the character with a fake password character.

In this embodiment, the replacing module 670 replaces every input character with a corresponding fake password character, so as to achieve an objective of disguise and interference, and to disturb a behavior of malicious stealing.

Through the foregoing processing on the key input event, a key input event triggered in an android platform is safer, and convenience is not provided for a malicious stealer because of a special open source feature thereof, which greatly reduces a risk that the input character is stolen, so that an application that has a payment function and runs in the android platform is safer in both login and payment stages.

Figure 7:
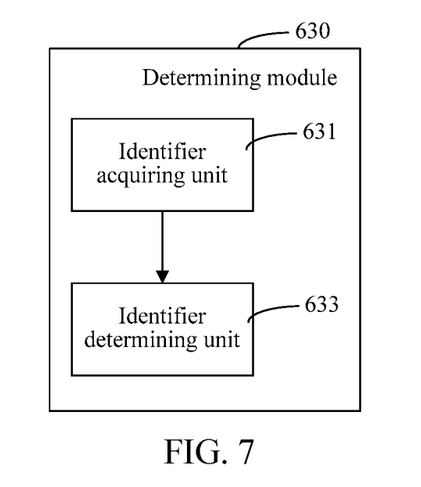
FIG. 7 is a schematic structural diagram of a determining module in FIG. 6.

As shown in FIG. 7, in an embodiment, the determining module 630 includes an identifier acquiring unit 631 and an identifier determining unit 633.

The identifier acquiring unit 63 is configured to acquire an identifier corresponding to the currently activated application interface view.

In this embodiment, every application interface view has a unique corresponding identifier, and therefore, if the currently activated application interface view is positioned, the identifier acquiring unit 631 acquires the identifier corresponding to the currently activated application interface view.

With contact between the user and the screen, the identifier acquiring unit 631 in a system senses a captured touch event, and processes the touch event by using a specific interface function. Specifically, using an instant messaging tool as an example, when the user touches, on a start interface of the instant messaging tool, an area in which a password input box is located, the identifier acquiring unit 631 acquires an identifier corresponding to this area.

The identifier determining unit 631 is configured to determine whether the acquired identifier is an input box identifier; and if yes, notify the event acquiring module 650; or if not, stop the procedure.

In this embodiment, the acquired identifier indicates whether the currently activated application interface view is the password input box, that is, a password box control view; specifically, the identifier determining unit 633 determines the acquired identifier by calling a touch event callback function, so as to perform a subsequent processing process according to a determining result.

Figure 8:
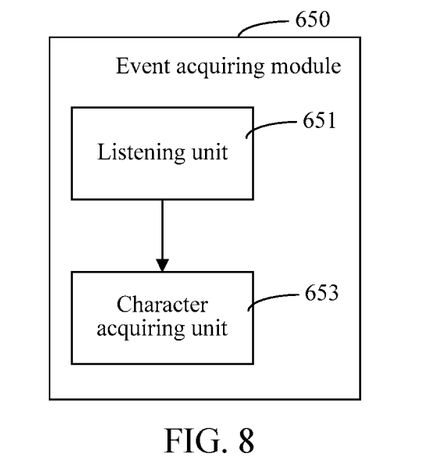
FIG. 8 is a schematic structural diagram of an event acquiring module in FIG. 6.

As shown in FIG. 8, in an embodiment, the foregoing event acquiring module 650 includes a listening unit 651 and a character acquiring unit 653.

The listening unit 651 is configured to obtain through listening the key input event triggered in the input box, and position a location of a cursor in the input box according to the key input event obtained through listening.

In this embodiment, with a character is input in the input box, the location of the cursor also changes constantly. After the listening unit 651 obtains through listening the key input event triggered in the input box, an onSelectionChanged function is reloaded to acquire the location of the cursor in the input box, so as to implement location tracking of the cursor in real time.

The character acquiring unit 633 is configured to acquire a character input at the location of the cursor, and store the input character according to the location of the cursor.

In this embodiment, the character acquiring unit 653 uses the location of the cursor a subscript of character string array memory, and stores the input character in the character string array memory, so as to implement accurate acquisition and storage of the character.

Specifically, for character input performed in the input box, a used input manner includes hard keyboard input and soft keyboard input, and therefore, the character acquiring unit 653 acquires the character according to an input manner.

In the hard keyboard input manner, the character acquiring unit 653 acquires the location of the cursor by reloading a dispatchKeyEvent function to acquire a currently input character, and stores the current input character into a new character string array memory.

In the soft keyboard input manner, the character acquiring unit 653 newly establishes an InputConnection input channel, binds the newly established InputConnection input channel and a currently triggered key input event, and processes the currently triggered key input event by using the newly established InputConnection input channel; in this case, system functions such as commintText, sendKeyEvent, setComposingText and finishComposingText are reloaded to intercept the currently input character, and the currently input character is copied into the new character string array memory.

The character string array memory stores the input character by using the location of the cursor as the subscript.

Figure 9:
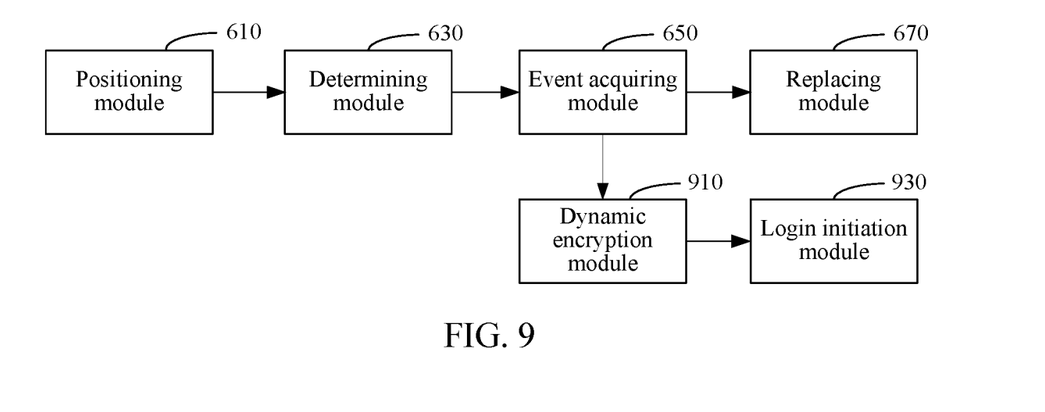
FIG. 9 is a schematic structural diagram of an apparatus for protecting an application program password of a mobile terminal in another embodiment.

As shown in FIG. 9, in an embodiment, the foregoing input box is a password input box, and the foregoing apparatus further includes a dynamic encryption module 910 and a login initiation module 930.

The dynamic encryption module 910 is configured to encrypt the input character dynamically to obtain an encrypted character string.

In this embodiment, the acquired input character is a corresponding password when the user logs in to the application; therefore, to further ensure login security, the dynamic encryption module 910 encrypts the input character dynamically, so that the password used to perform login verification is not transferred in a plaintext form.

The login initiation module 930 is configured to send the encrypted character string to a verification server, so as to request the verification server to perform login verification.

In this embodiment, the application interacts with the verification server, so as to complete, by using the verification server, the login verification initiated by the application.

Specifically, the login initiation module 930 sends the encrypted character string to the verification server, and after receiving the encrypted character string sent by the application, the verification server decrypts the encrypted character string to complete the login verification for the application, so as to ensure security of the login password.

By using the foregoing manner, the password is effectively prevented from being monitored and stolen by a malicious program, which ensures password security of the user, and improves security of the application.

In an embodiment, in a scenario in which the input box is the password input box, the foregoing apparatus further includes a validity detection module, where the validity detection module is configured to detect validity of the input character.

In this embodiment, the validity detection module detects whether the input character satisfies a character form requirement specified by the application itself, for example, an instant messaging tool only accepts a character string formed by characters within a specified range, and for other characters or special characters that are not within the specified range, the instant messaging tool cannot be logged in to normally; therefore, the validity detection module needs to detect the validity of the input character to determine whether the input character is valid, and character replacement and dynamic encryption can be performed under the precondition that a determining result is yes, so as to ensure that the application runs normally.

A person of ordinary skill in the art may understand that all or some of the processes of the methods in the foregoing embodiments may be implemented by a computer program instructing relevant hardware. The program may be stored in a computer readable storage medium, for example, in the embodiments of the present invention, the program may be stored in a storage medium of a computer system, and be executed by at least one processor in the computer system, so as to implement the procedure of the methods in the embodiments. The storage medium may be a magnetic disk, an optical disc, a read-only memory (ROM) or a random access memory (RAM).

The foregoing embodiments only show several implementation manners of the present disclosure, and are described in detail, but they should not be construed as a limitation to the patent scope of the present disclosure. It should be noted that a person of ordinary skill in the art may further make variations and improvements without departing from the ideas of the present disclosure, which shall fall within the protection scope of the present disclosure. Therefore, the patent protection scope of the present disclosure should be subject to the appended claims.

What is claimed is:

1. A method for protecting an application program password of a mobile terminal, comprising:
    positioning an application interface view in an application program of a mobile terminal, to obtain a currently activated application interface view;
    determining whether the currently activated application interface view is an input box; and if the determination is positive:
    acquiring a key input event triggered in the input box;
    obtaining at least one character input in the input box by using the key input event;
    determining that each of the at least one character satisfies a character form requirement specified by the application program comprising an acceptable set of input characters; and
    replacing each of the at least one character with a fake password character;
    wherein acquiring the key input event triggered in the input box and obtaining the at least one character by using the key input event further comprises:
        detecting the key input event triggered in the input box;
        determining a location of a cursor in the input box according to the key input event;
        reloading at least one system function to intercept the at least one character input in the input box; and
        acquiring the at least one character input at the location of the cursor via the at least one reloaded system function intercepting the at least one character, and storing the at least one character in a character string array memory at a position within the character string array memory corresponding to the location of the cursor.

2. The method according to claim 1, wherein positioning an application interface view in the application program of the mobile terminal, to obtain the currently activated application interface view comprises:
    positioning, for the application program of the mobile terminal, an application interface view at which a touch point on a touch screen is located, wherein the application interface view at which the touch point is located is the currently activated application interface view.

3. The method according to claim 1, wherein the step of determining whether the currently activated application interface view is an input box comprises:
    acquiring an identifier corresponding to the currently activated application interface view; and
    determining whether the acquired identifier is an input box identifier, and in response to determining that the acquired identifier is an input box identifier, performing the step of acquiring a key input event triggered in the input box and obtaining an input character by using the key input event.

4. The method according to claim 1, wherein the input box is a password input box, and after the step of acquiring a key input event triggered in the input box and obtaining an input character by using the key input event, the method further comprises:
    encrypting the input character dynamically to obtain an encrypted character string; and
    sending the encrypted character string to a verification server, to request the verification server to perform login verification.

5. An apparatus for protecting an application program password of a mobile terminal, comprising:
    a processor; and
    a memory to store instructions executable by the processor, wherein the processor is configured to:
position an application interface view in an application program of a mobile terminal, to obtain a currently activated application interface view;
determine whether the currently activated application interface view is an input box, and if the determination is positive:
acquire a key input event triggered in the input box and obtain at least one input character by using the key input event;
determine that each of the at least one input character satisfies a character form requirement specified by the application program comprising an acceptable set of input characters;
replace the character with a fake password character;
detect the key input event triggered in the input box;
determine a location of a cursor in the input box according to the key input event;
reload at least one system function to intercept the at least one input character in the input box; and
acquire the at least one input character input at the location of the cursor via the at least one reloaded system function intercepting the at least one input character, and store the at least one input character in a character string array memory at a position within the character string array memory corresponding to the location of the cursor.

6. The apparatus according to claim 5, wherein the processor is further configured to position, for the application program the mobile terminal, an application interface view at which a touch point on a touch screen is located, wherein the application interface view at which the touch point is located is the currently activated application interface view.

7. The apparatus according to claim 5, wherein the processor is further configured to:
acquire an identifier corresponding to the currently activated application interface view; and
determine whether the acquired identifier is an input box identifier, and in response to determining that the acquired identifier is an input box identifier, acquire a key input event triggered in the input box and obtain an input character by using the key input event.

8. The apparatus according to claim 5, wherein the input box is a password input box, and the processor is further configured to:
encrypt the at least one input character dynamically to obtain an encrypted character string; and
send the encrypted character string to a verification server, to request the verification server to perform login verification.

9. A non-transitory computer readable storage medium having stored therein one or more instructions, which, when executed by a computing device, cause the computing device to:
position an application interface view in an application program of a mobile terminal, to obtain a currently activated application interface view;
determine whether the currently activated application interface view is an input box; and if the determination is positive:
acquire a key input event triggered in the input box;
obtain at least one character input in the input box by using the key input event;
determine that each of the at least one character satisfies a character form requirement specified by the application program comprising an acceptable set of input characters; and
replace each of the at least one character with a fake password character;
wherein acquiring the key input event triggered in the input box and obtaining the at least one character by using the key input event further comprises:
detecting the key input event triggered in the input box;
determining a location of a cursor in the input box according to the key input event;
reloading at least one system function to intercept the at least one character input in the input box; and
acquiring the at least one character input at the location of the cursor via the at least one reloaded system function intercepting the at least one character, and storing the at least one character in a character string array memory at a position within the character string array memory corresponding to the location of the cursor.

* * * * *